United States Patent [19]

Fast et al.

[11] 3,956,124

[45] May 11, 1976

[54] HYPOLIMNION OXYGENATION

[75] Inventors: Arlo Wade Fast, Pacifica, Calif.; William Edward Grunert, Tonawanda; John Joseph Pietruszewski, Buffalo, both of N.Y.

[73] Assignee: Union Carbide Corporation, New York, N.Y.

[22] Filed: Nov. 25, 1974

[21] Appl. No.: 527,158

[52] U.S. Cl. .............................. 210/63 R; 210/170
[51] Int. Cl.² ........................................... C02B 1/34
[58] Field of Search ............ 210/220, 221, 15, 170, 210/63; 261/36 R, DIG. 75

[56] References Cited
UNITED STATES PATENTS
3,470,091  9/1969  Budd et al. ..................... 210/170

OTHER PUBLICATIONS

Amberg, R. H. et al., "Stream Reaeration With Tonnage Oxygen," found in Applications of Commercial Oxygen to Water and Wastewater Systems; (1973).

*Primary Examiner*—Charles N. Hart
*Assistant Examiner*—Benoit Castel
*Attorney, Agent, or Firm*—John C. LeFever

[57] ABSTRACT

The hypolimnion of thermally stratified water bodies is oxygenated by withdrawing water therefrom at rate of 10–200 percent of the hypolimnion volume per month, pressurizing the withdrawn water to superatmospheric pressure below 125 psig, injecting at least 80 percent oxygen gas at rate of 5–300 lbs. $O_2$ per million pounds withdrawn water but less than a rate to result in $O_2$ supersaturation at the remixing point, returning the mixture through conduit means and remixing same at rate to produce specified frictional head loss.

8 Claims, 4 Drawing Figures

HYPOLIMNION OXYGENATION

BACKGROUND OF THE INVENTION

This invention relates to a process for oxygenating the hypolimnion of thermally stratified water bodies such as lakes and impoundments.

A lake or impoundment may be sufficiently deep to stratify thermally during the warm season of the year as the surface layers of water rise in temperature. Due to a relatively high biological oxygen demand, the dissolved oxygen level in the hypolimnion drops to a low level unfavorable to the ecology of the body of water. Whereas the DO deficiency is caused by the high biological oxygen demand, its development and persistence is dependent upon natural thermal stratification which in effect isolates the bottom water from the source of atmospheric oxygen at the surface.

Thermal stratification may for example be typified by curve A of FIG. 1 which displays temperature variation with depth as may reasonably develop in natural course during late spring or early summer. It is seen that the surface stratum or epilimnion (0–6 ft. depth) is at a relatively uniform temperature near ambient (e.g., ~ 22°–23°C). Beneath this stratum is an intermediate depth of water known as the metalimnion or thermocline which exhibits a steep drop in temperature, and in FIG. 1, this drop is about 0.9°C per foot depth to a temperature of about 7°C at a depth of 23 feet. The hypolimnion stratum below the theromocline is at a relatively uniform cold temperature (e.g., 3°–7°C). In FIG. 2, stratification is represented by a warm surface layer of water 12, an intermediate thermocline (shaded stratum) 13, and hypolimnion 14.

It is usually desirable to preserve thermal stratification in lakes and reservoirs. Many forms of life such as trout can exist only at cold temperatures. The low temperature level of hypolimnetic water is often valuable and desirable when the water is used for cooling and/or domestic purposes. Destruction of stratification warms the bottom water and promotes growth and decay of aquatic plant life and accelerates biological activity. Intermixing the water strata will also raise sediments from the bottom which not only impairs clarity, but also further increases the oxygen demand of the water.

Curve B of FIG. 1 shows the dissolved oxygen profile which may typically develop as a consequence of high biological oxygen demand and thermal stratification. The DO drops below 1 ppm in the hypolimnion and is too low to support aquatic life and to avoid septicity. At least 2 ppm DDO is desirable and some forms of life require levels of 4–5 ppm.

It is known to oxygenate the hypolimnion of a thermally stratified body of water by a device resembling an inverted U-tube with the legs therof extending down into the hypolimnion. Water of low dissolved $O_2$ content is elevated through one of the legs, aerated with an $O_2$ containing gas (usually air), disengaged from undissolved gas bubbles, and returned down the other leg. The U-tube in some instances involves separate tubes or conduits facilitating some degree of lateral displacement of the respective ends for ingress of circulating water. In other instances, it may take the form of concentric conduits with respective ends vertically displaced.

Such devices are usually installed directly in the impoundment, either by floating the device on buoyant supports or by anchoring the device on bottom supports. The devices tend to be cumbersome and may detract from the esthetic and recreational value of the body of water. It is inconvenient and often impractical to provide service connection to the shore, e.g., power lines to drive motors for pumping and/or aeration, and a gas line to supply oxygen. To minimize off-shore power requirement, the water is usually circulated under low head, and in one known arrangement, the requirement for power is limited to the operation of an air blower to inject air into the up-flow leg of the system, thereby achieving water flow and aeration by an "air-lift" effect. In any event, the low pressure often limits both the rate of efficient $O_2$ dissolution and the DO level of the returned water. For example, the maximum DO level obtainable with air at one atmosphere pressure in the cool water from the hypolimnion is about 10–12 mg/l. As a result, large conduits are needed for water circulation in order to minimize fluid friction and maximize volumetric flow rate. Low DO level of the returned water means that a relatively high turnover rate must be imposed on the hypolimnion in order to furnish and distribute dissolved $O_2$ at a desired rate. High turnover tends to erode the thermocline and greatly increases the risk of completely mixing the impoundment. This limited $O_2$ transport capability per unit mass of recirculating water is particularly disadvantageous when moderately high DO levels, e.g., 5–7 mg/l are to be maintained in the hypolimnion. Even if the recirculating water were saturated with $O_2$ in the air, only about 5 lb. $O_2$ could be transferred per million pounds water circulated. In some instances, it may be desirable to oxygenate the entire hypolimnion to very high levels on the order of 15–20 mg/l, and obviously such levels could not be accomplished with air unless extremely high pressures were employed.

The so-called side stream pumping concept (SSP) has also been employed to increase the dissolved oxygen level of streams and of completely mixed bodies of water. According to the SSP concept, a fraction of the body of water (stream, lake or impoundment) is withdrawn, pumped to relatively high pressure, infused with gaseous $O_2$ and the highly oxygenated water is reinjected into the main body.

In prior art practice of SSP, the injected oxygen is not completely dissolved before re-admixture with the main body. In many instances, the amount of oxygen injected into the side stream is greater than that corresponding to the solubility limit of the water at conditions prevailing at the point of re-admixture. Hence, a two-phase mixture of gas bubbles is produced in the bulk liquid at the point of return. Such gas bubbles may be carried as a two-phase mixture through the side stream return conduit or they may be created at the point of return by throttling the side stream to supersaturated conditions.

Unfortunately, the prior art SSP concept described above is inappropriate for oxygenating the hypolimnion of a lake or impoundment. Production of gas bubbles within the hypolimnion will cause the cold liquid to up-well through the thermocline to the surface, thereby destroying stratification and completely mixing the body of water. For this reason, SSP has not been employed for oxygenating the hypolimnion. Without freedom to produce gas bubbles in the main body, the effective in situ mechanism for mass transfer is lost. Moreover, the DO-distributive effect of the gas bubbles is not available. The paradox results that water of the hypolimnion should be intermixed in order to suppress DO gradients but should not be intermixed because of the requirement to preserve thermal gradients.

Another deficiency of prior art SSP systems is the reliance upon high exit velocities at the remixing point. High exit velocities can be beneficial in applications where the body of water is already completely mixed or where complete mixing is permissible. Distribution of the highly oxygenated liquid is aided by jetting the return liquid forcefully into the main body, thereby stirring and mixing the water toward uniform DO concentration. However, for hypolimnion oxygenation, complete mixing of the water body must be avoided at all costs, and the momentum effect of return stream on the hypolimnion must be kept low.

An object of this invention is to provide an improved side stream pumping process for oxygenating the hypolimnion, which does not produce excessive gas bubbles and thereby destroy thermal stratification.

Another object of the invention is to provide an improved process which does not depend on high exit velocities at the remixing point in the hypolimnion.

Other objects and advantages of this invention will be apparent from the ensuing disclosure and appended claims.

SUMMARY

This invention relates to a process for oxygenating the hypolimnion of thermally stratified water bodies with high purity oxygen gas, using side stream pumping.

In this process, water is withdrawn from the hypolimnion at rate between 10 and 200 percent of the hypolimnion volume per month and first pressurized to superatmospheric pressure below 125 psig. At least 80 percent (by volume) oxygen gas is injected in the withdrawn pressurized water at rate between 5 and 300 lbs. oxygen per one million pounds withdrawn water. Also, the oxygen gas injection rate is less than the rate resulting in oxygen supersaturation of the withdrawn water at the pressure in the hypolimnion at the point of remixing. The resulting oxygen gas-water mixture is then returned to and remixed with the hypolimnion at rate to produce frictional head loss (in psi.) of at least 4 psi per 100 ft. of return conduit and at least 0.15 psi. per pound of injected gas per one million pounds withdrawn water.

As will hereinafter be described in detail, the invention has been successfully demonstrated in both shallow (30 feet depth) and deep (59 feet depth) impoundments. The hypolimnions were oxygenated without adversely affecting thermal stratification.

DESCRIPTION OF PREFERRED EMBODIMENT

Figure 2:
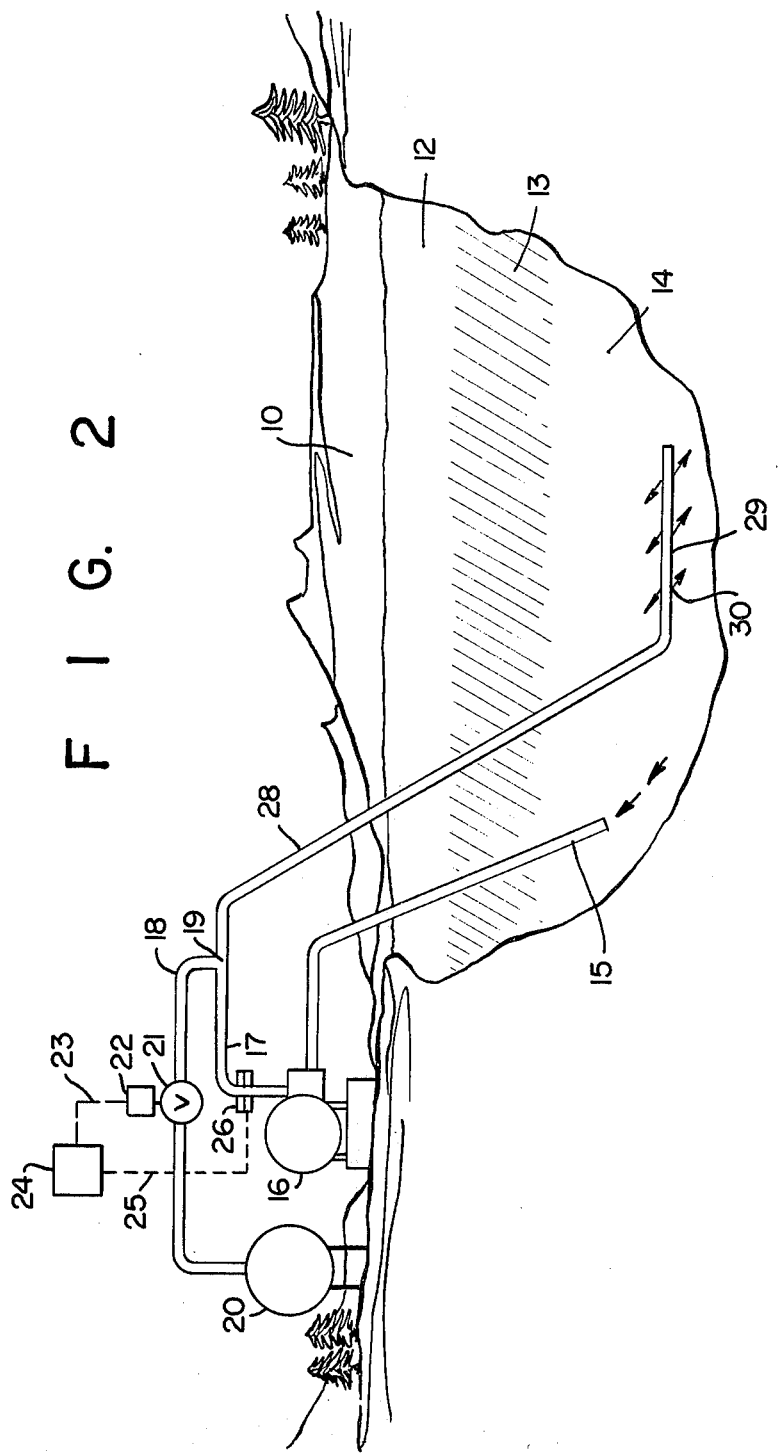
FIG. 2 is a schematic drawing of apparatus suitable for practice of the invention.

Referring now to FIG. 2, the apparatus includes intake conduit 15 through which water of the hypolimnion is withdrawn and conducted to pump 16 on the shore. The pressurized stream of water leaves the pump through conduit 17 and is infused with gaseous oxygen from conduit 18 at juncture 19. The gaseous oxygen is obtained from source 20, which for example may be a thermally insulated tank of liquid oxygen replenished by transport vehicle from a remote air separation plant. While not shown, vaporization means is understood to be associated with a liquid oxygen source for converting the fluid to gas. Alternatively, oxygen source 20 may comprise an on-site air separation plant.

Flow regulator 21 in oxygen supply pipe 18 may be a manual valve. Alternatively, regulator 21 may be positioned by operator 22 which in turn is controlled by signals through transmitting means 23 from controller 24. Controller 24 is conveniently and preferably responsive to signals through means 25 from a flow sensor such as orifice 26 in pump discharge conduit 17. The control of regulator 21 may be further modified as desired by other operating conditions such as temperature and pressure of water flowing in conduit 17.

At juncture 19, the gaseous oxygen is preferably diffused or sparged into the liquid to create an initial dispersion of bubbles in the water. Such devices are well-known and varied in design. The diffuser or sparger should be designed to produce bubbles of a size sufficiently small to be stable at the energy level prevailing in the stream flowing through conduit 28 downstream of juncture 19. By "stable" is meant that probability is low that bubbles will coalesce to form larger bubbles or gas pockets within or above the liquid in conduit 28.

Conduit 28 conducts the two-phase mixture from juncture 19 back to the hypolimnion 14. During such transit, the gas must be substantially completely dissolved in the pumped water in order to avoid discharge of gas into the hypolimnion with a significant up-welling or "chimney" effect through the thermocline. As discussed hereinafter, conduit 28 must be properly sized relative to other process conditions in order to avoid bubble coalescence and to obtain substantially complete gas dissolution i.e. at least 90 percent and preferably 95 percent dissolution with the residual as small bubbles.

Upon reaching the hypolimnion 14 at a point remote from the inlet of conduit 15 and preferably near the bottom of the lake or impoundment, the oxygenated water is discharged without high local disturbance of the hypolimnion water. The permissible level of local disturbance will depend upon the depth of the discharge point below the thermocline 13. When the discharge point is shallow or the volumetric flow rate of the pumped stream is large, a discharge manifold 29 containing for example small spaced orifices 30 along its length should be employed to distribute the total kinetic energy of the return flow.

The rate at which hypolimnion water is withdrawn for processing through the side stream pumping circuit is important and is selected in accordance with the invention, with due consideration to oxygen requirements and to stability of the thermal stratification of the lake or impoundment. The pumping rate should not exceed 200 percent of the hypolimnion volume per month, for even when stratification is quite stable, higher pumping rates impose unwarranted stirring action on the hypolimnion 14. High pumping rates inevitably set up strong convective currents between discharge and intake points, which gradually and progressively erode the thermocline 13.

Erosion of the thermocline 13 is essentially the mixing of warmer water from that transition zone into the colder water of the hypolimnion 14. Not only does the admixture warm the hypolimnion 14 undesirably, but in addition, the thermocline 13 is reduced in depth and the temperature gradient therethrough becomes much steeper, resulting in a higher rate of heat transfer between the warm epilimnion 12 at the surface to the hypolimnion 14. Furthermore, the size and cost of the pump and conduits and the power consumed will increase with higher circulation rates.

In practicing the invention, the pumping rate should be at least 10 percent of the hypolimnion volume per month. Lower pumping rates imply either a very low biological oxygen demand in the hypolimnion 14, or a very high dissolved oxygen concentration in the side stream. Very low oxygen demand can be readily supplied by air systems, since such demand can be met with relatively low dissolved oxygen transport capability in the circulating liquid. Very high dissolved oxygen concentrations in the side stream generally result in high power costs for dissolving oxygen. Moreover, the difficulty of releasing oxygenated water into the hypolimnion 14 without degassing also increases at high concentrations of the side stream. Finally, dissolved oxygen at high concentration levels may not distribute itself uniformly through the hypolimnion 14.

The range of recirculation from 10 to 200 percent of the hypolimnion volume per month refers to any significant period of continuous operation whether one month in duration or a much shorter period. However, the instant process is most suitably practiced steadily and continuously throughout the season during which thermal stratification prevails. Within this range, the choice of pumping rate for a given location will depend upon factors including oxygen depletion rate and depth of the hypolimnion. Low $O_2$ requirement generally implies low recirculation rates. Although the option exists of imposing high oxygen concentrations on low side stream pumping rate to achieve high unit oxygen transport, it was stated previously that excessive concentrations lead to high dissolution costs and more difficult remixing problems.

Hypolimnion depth has a strong influence on the stability of thermal stratification and on the tolerance of the hypolimnion to circulatory disturbance. If the remixing level is deeply submerged below the thermocline 13, then relatively high recirculation rates can be tolerated. However, a shallow hypolimnion is very sensitive to recirculation rate. For re-entry levels 25 feet or more below the thermocline, the recirculation rate can be at least 40 percent per month with little risk of destratification. At least 15 feet below the thermocline 13, recirculation rates should preferably not exceed 30 percent per month. For re-entry levels less than 15 feet below the thermocline 13, still lower recirculation rates are advisable and in addition, an extended re-entry manifold or alternatively multiple manifolds may be required to distribute the energy of re-entry over a large area of the hypolimnion. When the hypolimnion is suspected to be relatively unstable, preliminary tests should be conducted wherein hypolimnion temperature is monitored while gradually increasing the pumping rate so as to determine the tolerance of the body of water to circulatory disturbance.

Recirculation rates between 100 and 200 percent of the hypolimnion volume per month are best suited to intermittent or short-term oxygenation. Such operation may be preferred for deep lakes with stable stratification, and with relatively low oxygen depletion rates. In such instances, the DO level of the hypolimnion may be increased rapidly to a relatively high level such as 15 mg/l over a short period of time (1–2 weeks) during early summer. If the depletion rate is not high, the DO thus stored in the hypolimnion will sustain the lake for a number of weeks thereafter - perhaps for the entire summer. Such mode of operation permits more than one lake or impoundment to be serviced by a mobile unit containing an oxygen source and water pumping means.

In this invention, the pressure produced at pump 16 should not exceed 125 psig, even for the highest mass transfer requirements associated with intermittent oxygenation of the hypolimnion. For continuous oxygenation, the pump pressure preferably should not exceed about 90 psig. Higher pressures indicate an unnecessary expenditure of power and may result in excessive disturbance of the hypolimnion.

The oxygen depletion rate of a body of water may depend upon a number of factors such as temperature, flow rate and pollution level of water entering the lake by seepage or run-off, the profusion of plant life growing in the water and the quantity of biodegradable organic matter accumulated in bottom sediments. Oxygen depletion rate for a given lake or impoundment can be approximated by measuring the DO level of the lower strata of water at frequent intervals soon after stratification has occurred. The rate at which the DO level declines is a good indicator of the minimum rate at which oxygen must be supplied in order to sustain required levels for life support. Oxygen depletion rates will normally fall within the range of 0.02 to 2.0 mg/l per day. Oxygen supply rate may need to be marginally higher than a depletion rate determined in spring or early summer since oxygen demand of the water may increase as temperature rises during summer. Moreover, a supply rate somewhat higher than the depletion rate will be required in order to raise the DDO level of the hypolimnion by oxygenation, as opposed to merely sustaining an initial DO level.

It can be seen that when the depletion rate is at the low end of the foregoing range, a relatively massive dosage of oxygen early in the summer can sustain healthy hypolimnetic conditions for a long period of time without continued oxygenation. For example, with a depletion rate of 0.2 mg/l and an initial dosage to a level of 15 mg/l throughout, the hypolimnion should theoretically maintain levels above 4 mg/l for at least 55 days without continued oxygenation.

In preparation for oxygenating a specific lake or impoundment, it is necessary to know the approximate volume or mass of the hypolimnion 14. The volume may be calculated by methods well-known to those skilled in the art using knowledge of the topography of the lake bottom and of the vertical temperature gradients through the water. Be definition, the thermocline 13 comprises the stratum of water in which the temperature gradient is at least 0.55°F/ft depth (1°C/meter depth). The hypolimnion 14 comprises the "basin" below the thermocline 13 where the temperature gradient is less than the above minimum. It should be noted that for the purposes of this invention, "hypolimnetic volume" refers to the hypolimnion which develops by natural stratification. It will be evident from FIG. 3 (discussed hereinafter) that the thermocline can be thinned and weakened by erosion, thereby raising the boundary between thermocline and hypolimnion. However, the resultant increase in hypolimnetic volume should not be considered in subsequent application of this invention because greater depth of hypolimnion achieved by erosion does not produce greater thermal stability. Therefore, the tolerance of the hypolimnion to circulatory disturbance should be based on the depth which is naturally obtained.

Knowing the oxygen depletion rate and the hypolimnetic volume, the rate at which oxygen must be supplied continuously to the side stream pumping system can be calculated as the product of the depletion rate times the mass of water (millions of pounds) in the hypolimnion. This gives directly the pounds of oxygen per day needed for infusion at juncture 19 of FIG. 2. As stated previously, the depletion rate used in this computation may reflect modification to accomodate warmer summer temperatures and/or increases in hypolimnion oxygen level.

In the practice of the present invention, the factor which is important is not the total mass of oxygen infused at juncture 19 but rather the increase in oxygen concentrations of the pumped water represented by such infusion of oxygen. This important parameter can be expressed as the ratio of pounds oxygen infused per million pounds water pumped, and its values should be held within the limits of 5 to 300. The low end of the range implies low oxygen demand in the hypolimnion combined with high pumping rate. Such situation might occur when oxygen is initially quite low, but demand becomes very high during one particular period. An example is where a river brings in a large quantity of organic matter during a storm and where the organic matter then settles into the hypolimnion and depletes the oxygen. A high peak in the depletion rate would require oxygenation equipment of high capacity including piping and pump. During other periods, the depletion rate may be quite low and the oxygen supply rate can be correspondingly low. However, as discussed subsequently herein, the pumping rate must remain high at all times, compatible with the size of equipment components, in order to avoid acute operating problems in the return system and possible destratification of the body of water.

The portion of the foregoing range from 5 to 150 lbs. $O_2$ fed per million pounds water pumped, is best suited to continuous oxygenation of the hypolimnion, most preferably 20 to 100 lbs. $O_2$. The 5–30 lbs. $O_2$ portion of the range reflects $O_2$ requirements reasonably in accord with actual oxygen depletion rates and need not reflect the desire for a substantial increase in DO level in the hypolimnion, i.e. on the order of the oxygen depletion rate. The upper end of this broad range approaching 150 lbs. $O_2$/million lbs. water, is most likely employed in relatively deep lakes because hydrostatic pressure in excess of 60 ft. of water would be needed to avoid oxygen saturation at the point of readmixture. Values of the factor approaching 150 lbs. $O_2$ per million pounds water also imply relatively high oxygen depletion rates, i.e., at the high end of the range 0.02 to 2.0 mg/l per day, or relatively low pumping rates.

The portion of the above range from 150 to 300 lbs. $O_2$ fed per million pounds water pumped is best suited to intermittent, infrequent oxygenation of the hypolimnion involving a relatively rapid increase in DO concentration to substantial levels. This portion of the range further implies a deep lake where high hydrostatic pressure provides a high $O_2$ saturation value at the point of re-admixture. Relatively high oxygen concentrations may be used provided that devices such as eductors are properly employed. Such devices utilize the kinetic energy of the return liquid to aspirate or induct a large volume of low-DO water into the oxygenated water stream at the point of re-admixture. The high $O_2$ content return stream is thereby diluted by rapid mixing before degassing can occur. The use of devices such as eductors can extend the utility of highly oxygenated side streams to shallow lakes and impoundments which otherwise could not be serviced intermittently.

The oxygen gas is injected into the pressurized water at rate less than a rate resulting in oxygen supersaturation of the withdrawn water at the pressure prevailing in the hypolimnion at the point of remixing. Supersaturation would produce oxygen bubbles, a rising chimney effect and destratification of the water. By way of example, for a 30 foot depth the total pressure would be about 1.88 atmospheres. Since the $O_2$ saturation level of water is at least 45 mg/l (measured at 20°C), the oxygen-rich gas should be injected with the pressurized water at rate less than 1.88(45) = 85 lbs. per 1 million pounds water.

The oxygen purity of stream 18 infused at point 19 should be at least 80 percent and preferably at least 90 percent to avoid over-nitrification of the hypolimnion. It is recalled that total dissolution of gas occurs in conduit 28, and any nitrogen or argon in the gas will also be transported into the hypolimnion. The biological mechanism by which dissolved oxygen is assimilated and removed from the water, does not affect inert gases dissolved in the water. In the absence of a removal mechanism for such inert gases, they will accumulate to progressively higher concentrations detrimental to animal life in the hypolimnion. For example, assume that a system is operated with 50 percent hypolimnion circulation per month and that the circulated water is oxygenated to 80 ppm with feed gas containing 80 percent oxygen and 20 percent nitrogen. It is readily calculable that in one month's operation, the total nitrogen transferred to the hypolimnion will produce a concentration increase of 10 ppm assuming no significant "leakage" through the thermocline. In three month's operation, the nitrogen concentration can theoretically increase 30 ppm, reaching levels which in some situations exceed saturation and have been reported to be harmful to fish. Moreover, such high accumulations of nitrogen can result in degassing of the liquid at the suction of pump 16, thereby impairing pump performance. Any gas thus formed at the pump suction cannot conveniently be separated and rejected inasmuch as the suction pressure is marginally subatmospheric. Degassed nitrogen which is carried through the pump must be re-dissolved along with the fresh gas infused at point 19. This intensifies the mass transfer problem in conduit 28 and will often necessitate additional expenditure of power for dissolution. For these reasons, the purity of gas supplied in pipe 18 should be at least 80 percent and preferably at least 85 percent.

It was stated previously that the dispersion of gas bubbles in the water downstream of juncture 19 must be stable. If the bubbles of gas coalesce and form large pockets of gas in conductor 28, the gas will not be dissolved and will be dispersed as bubbles in the hypolimnion. Thus, the dissolved oxygen level of the hypolimnion will not be increased as desired, much of the infused oxygen will be lost to the atmosphere, and the chimney effect caused by the rising bubbles may destratify the body of water. Coalescence of bubbles in the oxygen gas-pressurized water return conduit can be avoided by maintaining a relatively high velocity and turbulence level in this pipe. The turbulence level should be adequate to produce a frictional head loss at all points in the return pipe equivalent to at least 4 psi pressure drop per 100 feet of pipe. Such energy dissipation will preserve small bubbles, break up any large bubbles which might occasionally be formed and thereby insure a large liquid-gas interface for high rate dissolution. For a specified pumping rate, the desired head loss per unit length of return conduit can be obtained in a smooth pipe of small diameter, or in a rough-walled pipe of larger diameter. Packing or other forms of turbulators (e.g., twisted tape) can also be employed within a large pipe to increase the turbulence level and energy dissipation per unit length of conduits.

Energy dissipation of the fluid within return conduit 28 must also satisfy an overall requirement during transit therethrough in order to effect substantially full dissolution of the gas. This requirement can be expressed in terms of frictional head loss in psi, per unit mass of gas infused at juncture 19 in each million pounds of withdrawn water. This requirement will vary from location to location and will depend upon factors such as temperature and depth of hypolimnion and dissolved gas concentration maintained throughout the hypolimnion. However, as explained previously, the higher dissolved gas concentrations obtained in the hypolimnion are identified with deeper bodies of water because the high hydrostatic pressure associated with the latter are needed to obtain saturation above such concentrations. A deeper hypolimnion favors mass transfer and tends to require less energy dissipation for full dissolution, whereas higher dissolved gas concentrations in the hypolimnion has the opposite effect. In practice, the two factors therefore tend to compensate rather than reinforce one another, and the energy dissipation requirement does not vary widely. In most cases, complete dissolution is obtained if energy dissipation in the return conduit is at least 0.15 psi per pound of injected gas per one million pounds withdrawn water. As stated above, the increase in dissolved gas concentration required in practice of this invention may be expressed in terms of pounds gas in the pipe at juncture 19 per each million pounds water in the pipe - between 5 and 300 lbs. oxygen per million pounds withdrawn water.

Knowing the energy dissipation required in return conduit 28, the pressure which must be developed at pump 16 can be determined. In preferred practice of this invention, the frictional head loss required in return conduit 28 for bubble stability and for mass transfer comprises the major component of the pressure head generated in pump 16. It is preferred not to employ throttling devices such as a valve in the return conduit since such expenditure of energy represents necessary use of energy and may result in degassing at the point of throttling. It is also preferred to minimize the head loss across orfices or eductors provided to introduce the oxygenated water into the hypolimnion. High re-admixing head losses tend to produce excessive circulatory disturbances in the hypolimnion, and should be only sufficient to assure uniform distribution of return water among multiple re-entry ports along the distributor manifold. The re-admixing head loss across orifices or simple nozzles should preferably not exceed 15 psi. With eductors or similar devices which diffuse the kinetic energy of the return water into much larger volumes of inducted water, the re-admixing head loss can be greater but preferably does not exceed 40 psi.

It is to be understood that pump 16 does not need to develop additional pressure equal to the hydrostatic head prevailing in the body of water at the point of re-admixture. Such hydrostatic head is developed by gravity acting equally upon the water within the conduit 28 - and externally thereof within the main body of water. It is fortuitous that the hydrostatic head develops in the return conduit without expenditure of pumping energy. Such increase in hydrostatic pressure along the pipe compensates for the loss in head due to friction, so that the total head will usually not diminish greatly and in some instances may actually increase. Thus a severe drop in saturation level of the gas in the liquid does not occur and mass transfer rates are sustained at maximum levels.

EXAMPLE I

Figure 1:
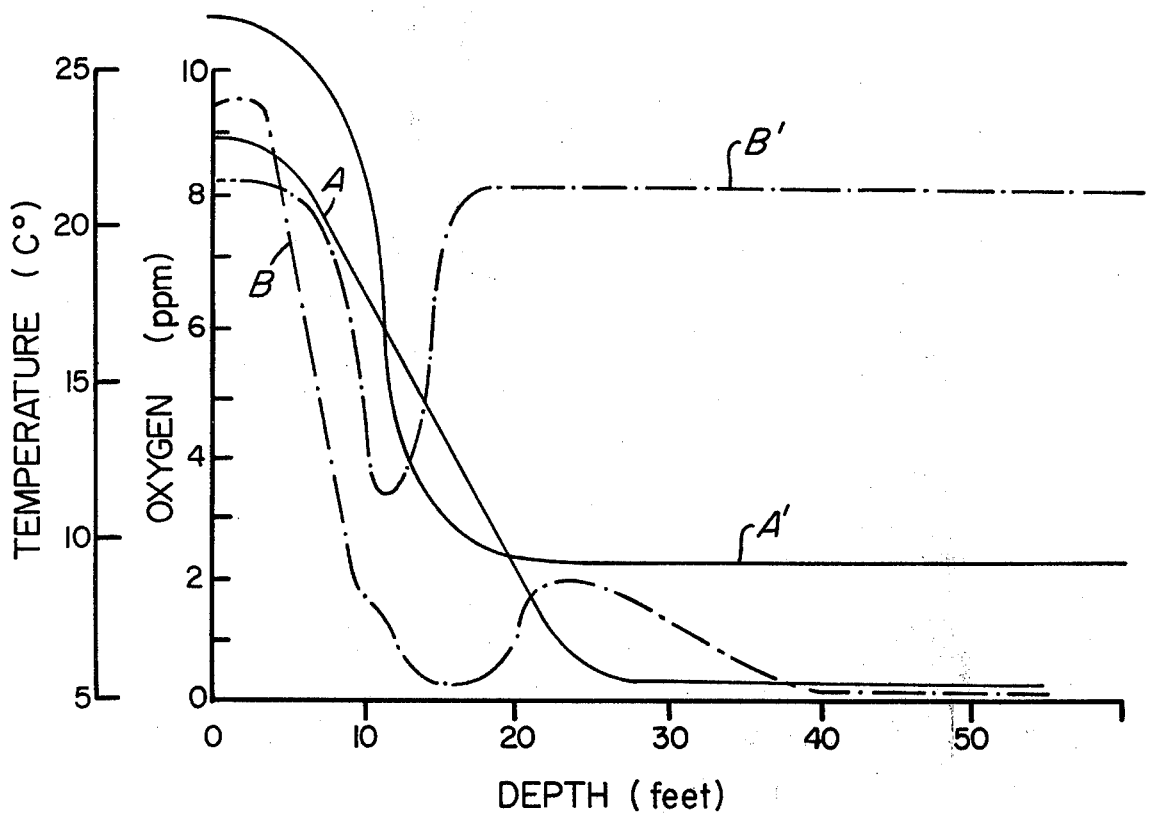
FIG. 1 is a graph showing oxygen and temperature profiles in a 59 foot deep water impoundment before side stream pumping and after practice of the invention.

In one test of the invention, an impoundment of water having a maximum depth of about 59 feet and a hypolimnion volume of about $3.3 \times 10^6$ gallons, was oxygenated by side stream pumping. Prior to commencement of oxygenation, the temperature and oxygen profiles A and B respectively were approximately as shown in FIG. 1. It is seen that the hypolimnion oxygen level was below 0.5 mg/l, and since similar conditions had developed during a number of previous years, most cold water species of fish were extinct.

A side stream pumping system was installed consisting of a 2-inch withdrawal pipe 15 about 100 feet in length with its inlet end immersed in the hypolimnion, an on-shore centrifugal pump, a liquid oxygen supply (99.5 percent purity), a vaporizer and a 1½ inch diameter return conduit 28 to the hypolimnion. Water was withdrawn at a rate of 53 gpm or about 70 percent hypolimnion volume per month. The water was pumped to a pressure of 39 psig with 15 psi head loss across the return conduit and 24 psi head loss across eductors at the remixing point. Gaseous oxygen was infused at a rate of 20 lbs. per day through a diffuser containing multiple orifices 1/32 inch diameter. Therefore, the oxygen was injected at a rate of 31.5 lbs. per million pounds of withdrawn water. The 1½ inch return conduit 28 was 250 feet in length and with the 53 gpm withdrawal rate, the frictional head loss was 6 psi per 100 feet length and 0.48 psi per each pound gas injected into 1 million pounds withdrawn water.

After approximately two months operation of the system, the temperature and oxygen profiles through the water depth were the higher A' and B' values shown in FIG. 1. Comparison with the lower curve B shows that the dissolved oxygen level in the hypolimnion had been increased to 8 mg/l. Comparison of curves A' and A reveals that during practice of the invention, hypolimnion temperature averaged 9°C and was only about 5°C higher than when oxygenation commenced. A substantial part of this temperature rise would occur absent practice of the invention, due to normal heat flow to the hypolimnion during warm ambient conditions of summer. The test was continued until natural destratification occurred due to cold ambient conditions. Inspection of the hypolimnion of the above impoundment after oxygenation showed that cold water fish species which had been introduced soon after oxygen levels were raised were healthy. Water clarity had also improved remarkably.

EXAMPLE 2

In another test in the same body of water described in Example 1 and with the same SSP system, the pumping rate was 53 gpm and the oxygen (99.5 percent purity) injection rate was increased to 50 lbs. per day or 79 lbs. oxygen injected per million pounds withdrawn water. The pressure developed at the pump was 39 psig (again with 24 psi head loss across eductors) which provided a frictional head loss in the return conductor of 6 psi per 100 feet of pipe and 0.19 psi per pound gas injected into one million pounds withdrawn water. A primary purpose of this test was to study the effect of high dissolved $O_2$ concentrations on life in the impoundment, and the DO level of the hypolimnion was increased to 22 mg/l during a 20-week period of oxygenation. The study showed that aquatic life was not adversely affected at this level of dissolved $O_2$. Another significant finding from this test was that substantially all the oxygen fed to and dissolved in the pumped water could be accounted for either as increased DO level of the hypolimnion or as biologically consumed oxygen. This shows that very high dissolved oxygen levels in the hypolimnion (substantially higher than that which prevails in the epilimnion) can be maintained without significant "leakage" through water strata above the hypolimnion.

EXAMPLE 3

Figure 3:
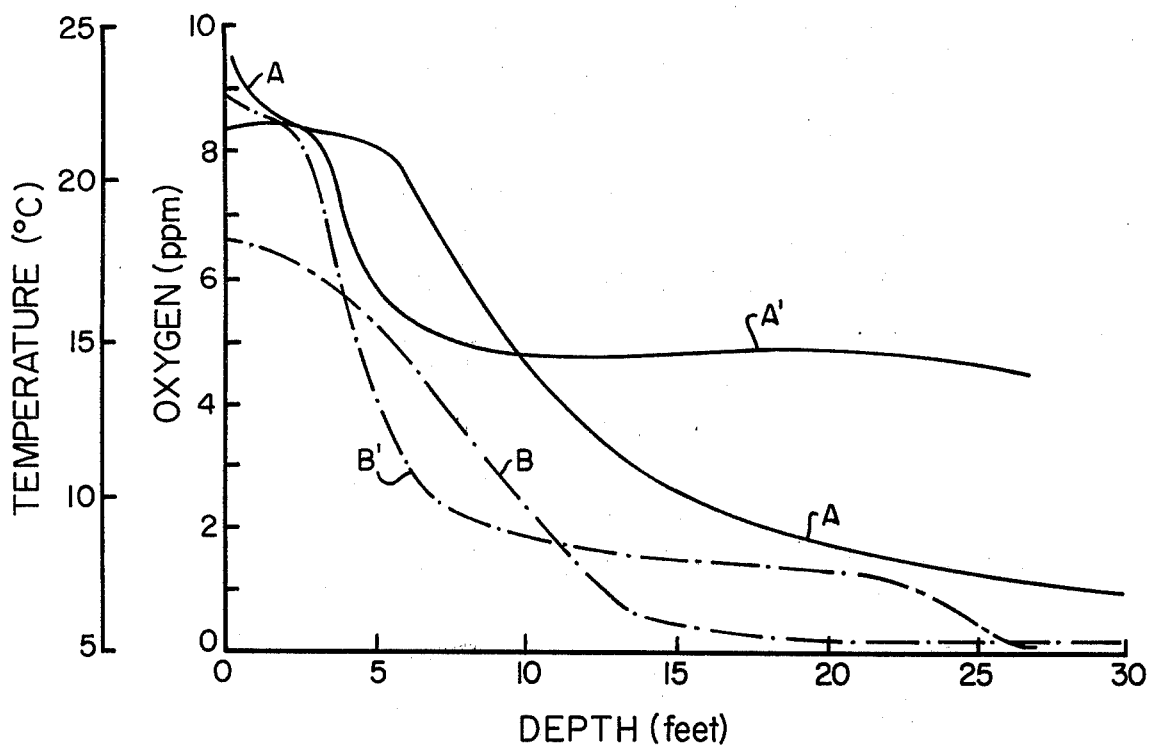
FIG. 3 is a graph showing oxygen and temperature profiles in a 30 foot deep water impoundment before side stream pumping and during SST but at lower oxygen gas injection rate than required by the invention.

Other tests were conducted on a shallower impoundment and demonstrate the susceptability of relatively thin, saucer-like basins to destratification. The reservoir was 30 ft. in depth with a surface area of about 11 acres and a hyplimnetic volume of $14.4 \times 10^6$ gallons. FIG. 3 shows the natural thermal stratification (curve A) and DO profile (curve B) which developed in the water prior to oxygenation. The thermocline extended down to about 14-ft. depth. The average hypolimnetic temperature was 8°C and the Do concentration less than 0.5 mg/l. The return conduit was 3 inches diameter and 450 ft. long, and terminated in discharge nozzle located about 3 ft. off the bottom. Thus, the re-admixing level was 13 feet below the thermocline. Initially, the withdrawal rate was 300 gpm, or about 90 percent hyplimnetic volume per month, and the oxygen feed rate was 60 lb. per day or 16.7 lb. $O_2$ injected per million pounds withdrawn water. The pump discharge pressure was 55 psig with 32 psi across the return conduit and 23 psi across eductors. Frictional head loss through the return conduit was 7.1 psi per 100 ft. conductor and 1.92 psi per pound oxygen (99.5 percent purity) injected into each million pounds withdrawn water.

Curves A' and B' in FIG. 3 shows the water conditions after only 10 days operation as described above. Whereas the dissolved oxygen level was being raised successfully (curve B'), the thermocline was undergoing severe erosion (curve A'). The hyplimnion had warmed to an average temperature of about 15°C and the reservoir was near the point of complete destratification. It is evident that excessive disturbance was produced in the shallow hypolimnion (15 ft. below the thermocline) by a water withdrawal rate which was excessively high relative to the oxygen gas injection rate. That is, whereas this process requires injection of oxygenrich gas into the pumped water at rate of at least 30 lbs. oxygen per million pounds withdrawn water, in this test the gas injection rate was only 16.7 lb. $O_2$ per million pounds water.

EXAMPLE 4

Figure 4:
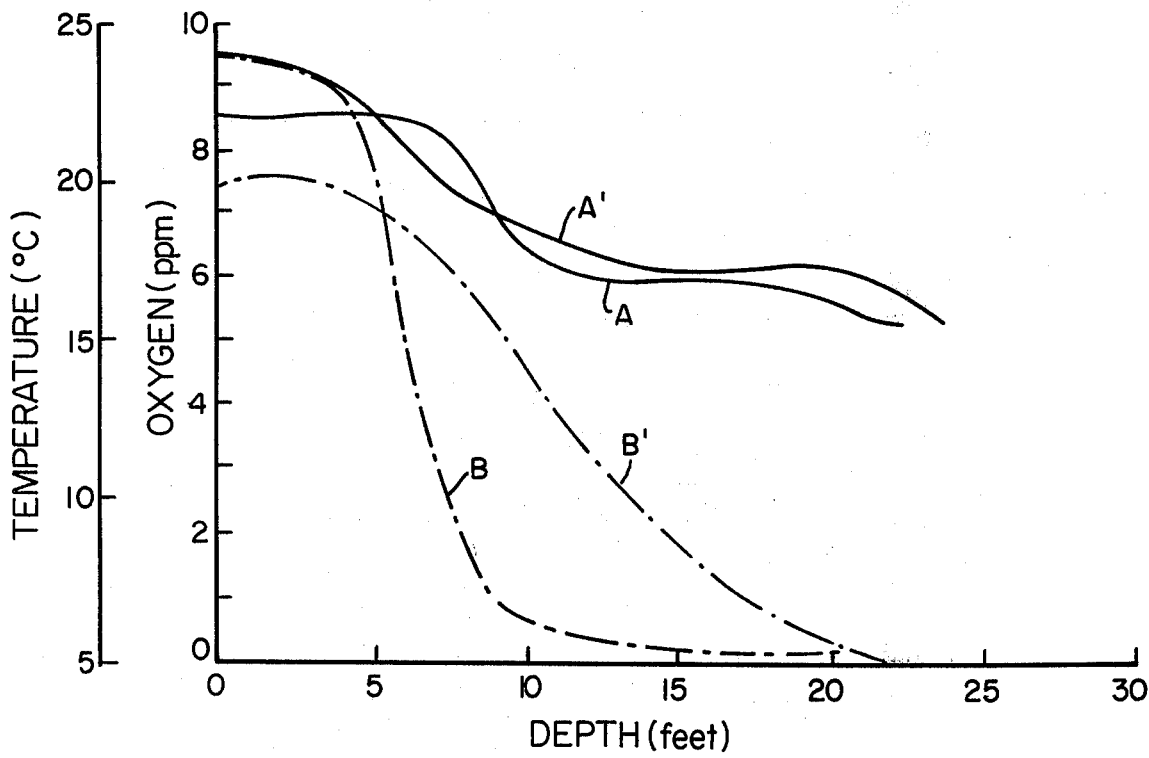
FIG. 4 is a graph showing oxygen and temperature profiles in the same 30 foot deep water impoundment as in FIG. 3 after SST with prohibitively low oxygen gas injection rate and also after an oxygen gas injection rate characteristic of the invention.

The above test was discontinued and the oxygen gas - withdrawn water return system was modified by adding a more extended distribution manifold with low pressure drop nozzles at the re-mixing level. After modification was completed, the temperature and dissolved oxygen profiles in the reservoir appeared as curves A and B respectively in FIG. 4. The oxygen level had again dropped to below 0.5 mg/l in the hypolimnion due to biological depletion. The system was restarted with a withdrawal rate of 165 gpm (about one-half the previous rate) or about 50 percent hypolimnetic volume per month, and with an oxygen feed rate of 60 lb. per day or 30.5 lb. $O_2$ injected per million pounds withdrawn water. The pump was operated at a discharge pressure of 60 psig with 20 psi. pressure drop through the return conduit and 40 psi. drop across special eductors at the remixing point. Frictional head loss through the return conduit was 4.4 psi per 100 ft. conductor and 0.65 psi per pound oxygen (99.5 percent purity) injected into each million pounds withdrawn water. After one month's operation, profiles appeared as curves A' and B' in FIG. 4. In comparing the FIG. 4 profiles, the significant observation is that there was virtually no change in hypolimnetic temperature during the period of operation with a withdrawal rate of 50 percent hypolimnetic volume per month.

EXAMPLE 5

Still further tests conducted at the shallow, 30 ft. deep impoundment described above, demonstrate the importance of maintaining adequate frictional head loss in the return conduit. In one test, a similar SSP system was employed which included a 3-inch diameter return conduit, 470 feet long. The withdrawal rate was reduced relative to previous tests to 80 gpm (24 percent hypolimnetic volume per month), and the feed rate of oxygen was varied from 10 to 40 lbs. per day or 10.4 to 41.6 lbs. per million pounds withdrawn water. The pressure developed at the pump was 68 psig but was throttled at the pump to 11 psig with 7 psi across remixing orifices. Frictional head loss was only 0.85 psi per 100 feet of return conduit, and between 0.01 and 0.38 psi per pound oxygen injected into each one million pounds withdrawn water. Under these conditions, a stable bubble dispersion was not obtained. Pockets or slugs of gas formed in the return conduit and were discharged into the hypolimnion.

The return conduit was then replaced with smaller pipes. A portion of the conduit, 300 feet long, was 2-inch diameter and the remaining portion, 80 feet long, was 1½ inch diameter. The relative lengths of the two sizes were chosen to produce a total frictional head loss of 61 psig, and a head pressure at the pump of 68 psig (7 psi across re-entry orifices). Using a withdrawal rate of 85 gpm (25.5 percent hypolimnetic volume per month) and an oxygen (99.5 percent purity) feed rate of 70 lbs. per day (68.5 lbs. per million pounds withdrawn water), the frictional head loss (divided equally between 2-inch and 1½ inch pipe) was 10 psi per 100-feet of 2-inch pipe and 38 psi per 100-feet of 1½ inch pipe averaged at 15.9 psi per 100 feet of return conduit, and 0.89 psi per pound oxygen injected into each one million pounds withdrawn water. Under these conditions, the bubble dispersion was stable, virtually complete gas dissolution occurred in the return conduit, and gas bubbles could not be detected in the main body of water.

In a preferred embodiment of this invention process, water is withdrawn from the hypolimnion at rate between 20 and 100 percent of the hypolimnion volume per month and at least 90 percent oxygen (by volume) gas is injected in the withdrawn pressurized water at rate between 20 and 100 lbs. oxygen per million pounds withdrawn water.

Although certain embodiments have been described in detail, it will be appreciated that other embodiments are contemplated along with modifications of the disclosed features. For example, a single lake or impoundment may be serviced by more than one side stream pumping system operated in accordance with the invention. In such case, the combined water recirculation rate for all such systems should not exceed the allowable recirculation rate based on stability of the hypolimnion. A single pump may receive water from more than one intake conduit and/or may discharge into more than one return conduit. In the latter case the energy dissipation characteristics of each return conduit and the gas feed rate thereto should comply with the operating limits specified herein. Dual return conduits may also be of different size with provision for alternate operation to accommodate seasonal variations in the oxygen depletion rate.

What is claimed is:

1. A process for oxygenation of the hypolimnion of thermally stratified water bodies comprising the steps of: Withdrawing water from the hypolimnion at rate between 10 and 200 percent of the hypolimnion volume per month; pressurizing the withdrawn water to superatmospheric pressure below 125 psig; injecting at least 80 percent oxygen (by volume) gas in the withdrawn pressurized water at rate between 5 and 300 lbs. oxygen per million pounds withdrawn water but less than a rate resulting in oxygen supersaturation of the withdrawn water at the pressure in the hypolimnion at the point of remixing; returning the oxygen gas - water mixture through conduit means to and remixing same with the hypolimnion at rate to produce frictional head loss of at least 4 psi per 100 feet length of said conduit means, and also at least 0.15 psi per pound of injected gas per one million pounds withdrawn water.

2. A process according to claim 1 wherein the oxygen gas - water mixture is returned to the hypolimnion at least 25 feet below the top of the hypolimnion, and the water withdrawal rate therefrom is at least 40 percent of the hypolimnion volume per month.

3. A process according to claim 1 wherein the oxygen gas - water mixture is returned to the hypolimnion at less than 15 feet below the top of the hypolimnion, and the water withdrawal rate therefrom is less than 30 percent of the hypolimnion volume per month.

4. A process according to claim 1 wherein the remixing head loss across the return conduit discharge end is less than 15 psi.

5. A process according to claim 1 wherein the oxygen gas is injected in the withdrawn pressurized water at rate between 20 and 100 lbs. oxygen per million pounds withdrawn water.

6. A process according to claim 1 wherein water is withdrawn from the hypolimnion at rate between 20 and 100 percent of the hypolimnion volume per month.

7. A process according to claim 1 wherein at least 90 percent oxygen (by volume) gas is injected in the withdrawn pressurized water.

8. A process according to claim 1 wherein water is withdrawn from the hypolimnion at rate between 20 and 100 percent of the hypolimnion volume per month and at least 90 percent oxygen (by volume) gas is injected in the withdrawn pressurized water at rate between 20 and 100 lbs. oxygen per million pounds withdrawn water.

* * * * *